United States Patent [19]

Davalos et al.

[11] Patent Number: 4,790,593
[45] Date of Patent: Dec. 13, 1988

[54] PROTECTIVE SUPPORT ASSEMBLY FOR AN OCCUPANT OF A VEHICLE

[76] Inventors: Manuel R. Davalos, 4040 W. 7th La., Hialeah, Fla. 33012; Kenneth B. Feldman, 280 N.E. 173 St., North Miami Beach, Fla. 33162

[21] Appl. No.: 924,980

[22] Filed: Oct. 23, 1986

[51] Int. Cl.$^4$ ............................................. A47C 31/00
[52] U.S. Cl. .................... 297/250; 297/216; 297/328; 297/488
[58] Field of Search .............. 297/192, 216, 217, 250, 297/484, 485, 321, 325, 328, 467, 486, 487, 488

[56] References Cited

U.S. PATENT DOCUMENTS

| | | | |
|---|---|---|---|
| 2,509,040 | 5/1950 | Kibbe | 297/325 X |
| 3,762,767 | 10/1973 | Powell | 297/184 X |
| 4,124,249 | 11/1978 | Abbeloos | 297/391 X |
| 4,438,940 | 3/1984 | Hunt | 297/184 X |
| 4,470,631 | 9/1984 | Powell | 297/184 X |
| 4,500,133 | 2/1985 | Nakao et al. | 297/377 X |
| 4,500,135 | 2/1985 | Kincheloe | 297/488 X |
| 4,545,617 | 10/1985 | Drexler et al. | 297/320 X |
| 4,579,385 | 4/1986 | Koenig | 297/184 |
| 4,583,779 | 4/1986 | Myers | 297/184 |
| 4,627,659 | 12/1986 | Hall | 297/184 X |

FOREIGN PATENT DOCUMENTS 3441543 6/1985 Fed. Rep. of Germany ...... 297/250

Primary Examiner—Kenneth J. Dorner
Assistant Examiner—Thomas A. Rendos
Attorney, Agent, or Firm—Charles J. Prescott

[57] ABSTRACT

A support structure in the form of a seat, for an occupant in a vehicle which also serves as a protective assembly by enclosing the occupant within a hollow interior portion defined in part by an ovoidal shaped shell formed of impact-resistant material wherein the head, torso and lower or underportion of the occupants are essentially surrounded or enclosed so as to prevent severe damage to the occupant in cases of vehicle emergencies such as collision or crash. A closure at least partially covers an access opening to the interior allowing entrance and exiting of the occupant from the protective shell wherein adequate space is provided for viewing through the access opening above and beyond the closure. Additional supplementary features may include a combined audio and speaker assembly so as to provide sound recording, radio reception, etc. to the interior of the shell and the occupant therein.

12 Claims, 3 Drawing Sheets

PROTECTIVE SUPPORT ASSEMBLY FOR AN OCCUPANT OF A VEHICLE

BACKGROUND OF THE INVENTION

1. Field of the Invention

This invention relates to a protective shell structure preferably having an ovoidal configuration and being specifically dimensioned and configured to define a hollow interior in which an occupant may be supported in a sitting or at least partially inclined position wherein the shell is positionable on a supporting surface of a vehicle such as but not limited to the vehicle seat and anchored by a conventional restraining strap or the like wherein the occupant is adequately maintained in the seated or inclined position in case of vehicle emergency but is further protected from impact or collapse of the vehicle structure and from direct impact to his person.

2. Description of the Prior Art

Safety devices including seat belts of various designs and configurations or safety harnesses have been known and incorporated in vehicles, especially automobiles, for many years. In the case of adults or children old enough to be supported in an upright fashion in a conventional vehicle seat, shoulder and lap harnesses generically known as "seat belts" are the typical means of securement or protection in terms of insuring that the occupant is maintained in the seat during emergency situations, however, such safety devices are primarily designed to prevent the occupant from being thrown from the automobile or against the dash or window portions of the vehicle.

Infants on the other hand generally require somewhat greater protection since they do not have the size or muscle tone to maintain themselves in an upright, stabilized position in the conventional seats associated with an automobile, airplane or any like vehicle. Accordingly, infant carriers or protective seat structures are in common use in today's modern society. Typically, such infant safety seats are mountable on a conventional seat or like supporting surface of a vehicle and anchored in such position by a structure incorporated in the seat itself or through the use of the seat belts or like structure associated with the vehicle. Additional containment means may be mounted on the infant seat structure so as to insure that the infant will not be thrown or inadvertently removed from the infant seat. Existing U.S. patents being generally representative of safety seats or infant carriers include the U.S. Pat. Nos. 4,311,339 to Heath; Converse, 4,436,341 and Koenig, 4,579,385.

Even in light of the various safety devices and structures being utilized, it is still a statistical fact that severe damage and death is frequently caused in more severe crashes or vehicular accidents due to various portions of the vehicle impacting against the occupant even though he has been maintained in his seat. Accordingly, there is a need in this industry for a support structure and protective assembly capable of effectively surrounding or at least partially enclosing an occupant of a vehicle. Such a preferred structure is formed of an impact-resistant material of sufficient strength to prevent the vehicle, or portions thereof from collapsing against the occupant's body in the event of severe accidental collision or crash of the vehicle.

SUMMARY OF THE INVENTION

The present invention is directed towards a support assembly for an occupant while traveling in a vehicle which is also structured to include a protective shell preferably formed of a relatively lightweight, high strength, impact resistant material. In a preferred embodiment, the shell of the subject support and protective assembly has a hollow interior portion thereby defining a housing for an occupant to be positioned, supported and contained therein. The outer shell is configured to substantially surround and at least partially enclose the head, shoulders, torso and lower extremities of the occupant's body with the exception that the feet and/or legs may extend partially from the shell to add comfort to the occupant and allow its use for a variety of sizes of occupants ranging from infant children to full size adults.

While the support and protective structure of the present invention is described hereinafter primarily for use within automobile type vehicles, it should be emphasized that such a structure could be used to enclose and thereby protect and support an occupant in any of the wise variety of specific applications including airplane travel. Also, the present structure is adaptable for military or scientific space travel as a protective containment or enclosure assembly which will offer an efficient means of protecting the occupant from components of the vehicle impacting against his person such as in situations of vehicle collapse common to aircraft accidents.

The shell includes an integrally formed access opening substantially formed on the inner face thereof so as to provide access to the hollow interior of the shell and allow the occupant to be readily positioned and removed therefrom. A closure means in the form of a closure door is selectively positionable between an open and closed position wherein the closed position effectively disposes the door in overlying and covering relation to the frontal portion of the occupant so as to define a structure which surrounds and almost completely encloses the occupant thereby further protecting the occupant from objects or components of the vehicle forcibly coming in contact with the occupant's person.

The shell is secured to a base which in turn rests on a supporting surface on the interior of the vehicle, such as a vehicle seat. Specific structural features of the base include an adjustability feature which allows variance or adjustment in the spacing between the shell and the supporting surface on which the base is positioned. In addition, the base is structured so as to effectively and at least to a minimal extent, allow for the adjustment of the degree of incline at which the occupant within the shell is positioned.

A connecting means is provided in the shell proper so as to cooperate, through an anchored connection with the safety harness, seat belts, etc. normally associated with the vehicle structure and particularly the seat or supporting surface on which it is mounted. In addition, a containment means is provided in the form of a shoulder and torso harness passing over the shoulder and frontal area of the occupant so as to maintain the occupant in the seated and supported position on the interior of the shell whereby resisting dislodgement of the occupant during sudden deacceleration or stopping of the vehicle.

Other supplementary features possibly incorporated in certain embodiments of the subject invention is the inclusion of an audio assembly such as a tape deck, radio, etc. electrically connected to a speaker assembly including at least one but preferably two spaced apart speaker structures secured to the shell and communicating directly with the interior thereof and preferably located on the opposite sides of the occupant's head. The speakers thereby allow listening of the occupant, on the interior of the shell to a selective or prearranged sound recording in an essentially "private" fashion. Such sound directed to the interior of the shell could be selectively changed to include receiving broadcasts from a centralized channel or broadcasting network or alternately be of a more selective nature such as when individual cassette tapes are provided for education or enjoyment.

DETAILED DESCRIPTION OF THE INVENTION

Figure 1:
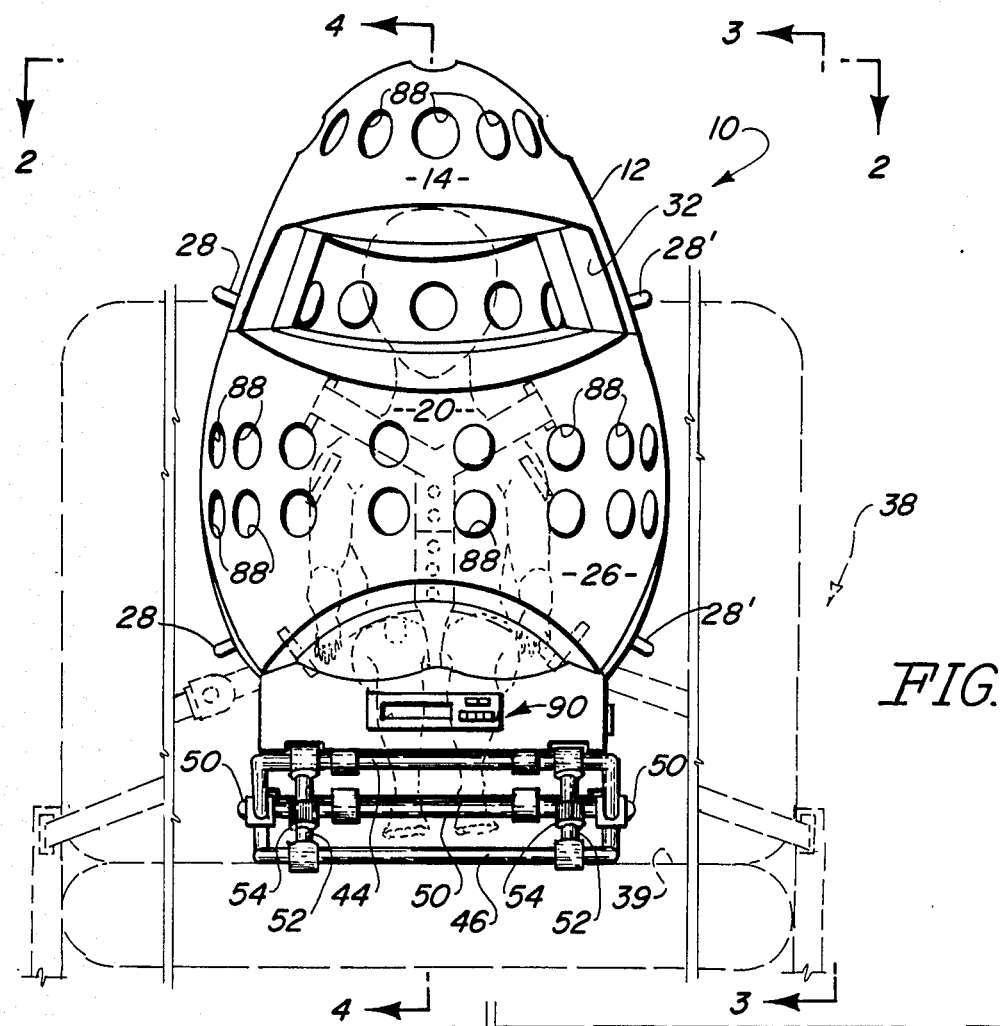
FIG. 1 is a front elevational view of the support and protective assembly of the present invention mounted on a seat or like supporting surface, represented in phantom lines.

As shown in FIGS. 1-5, the combined support and protective assembly of the present invention is generally indicated as 10 and includes a housing defined by an outer shell 12 preferably formed of an integral, one-piece construction and including a top portion 14, a mid portion 16 and a bottom portion 18, all of which may be formed from a lightweight, high strength, impact-resistant plastic or like material capable of withstanding force of impact from a variety of heavy objects.

An important feature of the present invention is the existence of a dimension and configuration sufficient to effectively enclose and surround the occupant 20 within a hollow interior portion. More specifically, the top portion 14 of the shell is configured in surrounding relation to the side, rear, top and frontal portions of the head of the occupant 20. The mid portion 16 is configured in surrounding relation to the side and back portions of the torso of the occupant. The underportion 18 is disposed and configured in surrounding relation to the underportions of the lower extremities including the hip, buttocks, etc. of the occupant as clearly shown in FIGS. 1-5. While the shell defining the housing is generally divided into the aforementioned portions including top portion, mid portion and bottom portion, 14, 16 and 18 respectively, it is again to be emphasized that in a preferred embodiment, the shell is formed of an integral one-piece construction wherein the various portions 14, 16, and 18 are fixed relative to one another so as to add strength and facilitate manufacture of the device.

Figure 2:
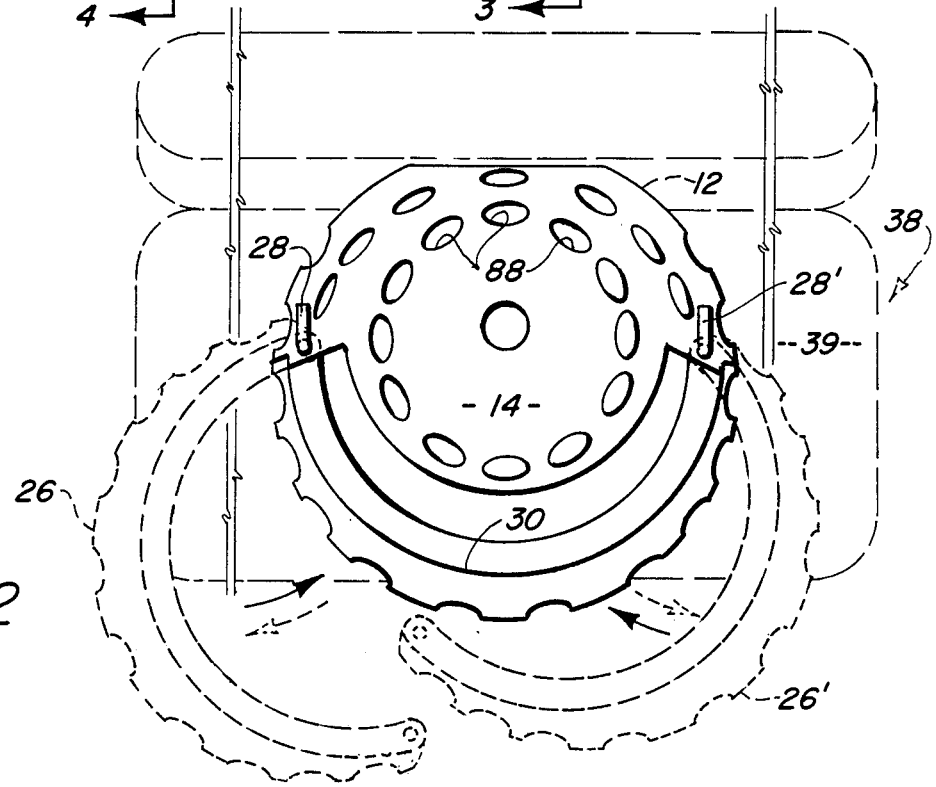
FIG. 2 is a top plan view along line 2—2 of FIG. 1.
Figure 3:
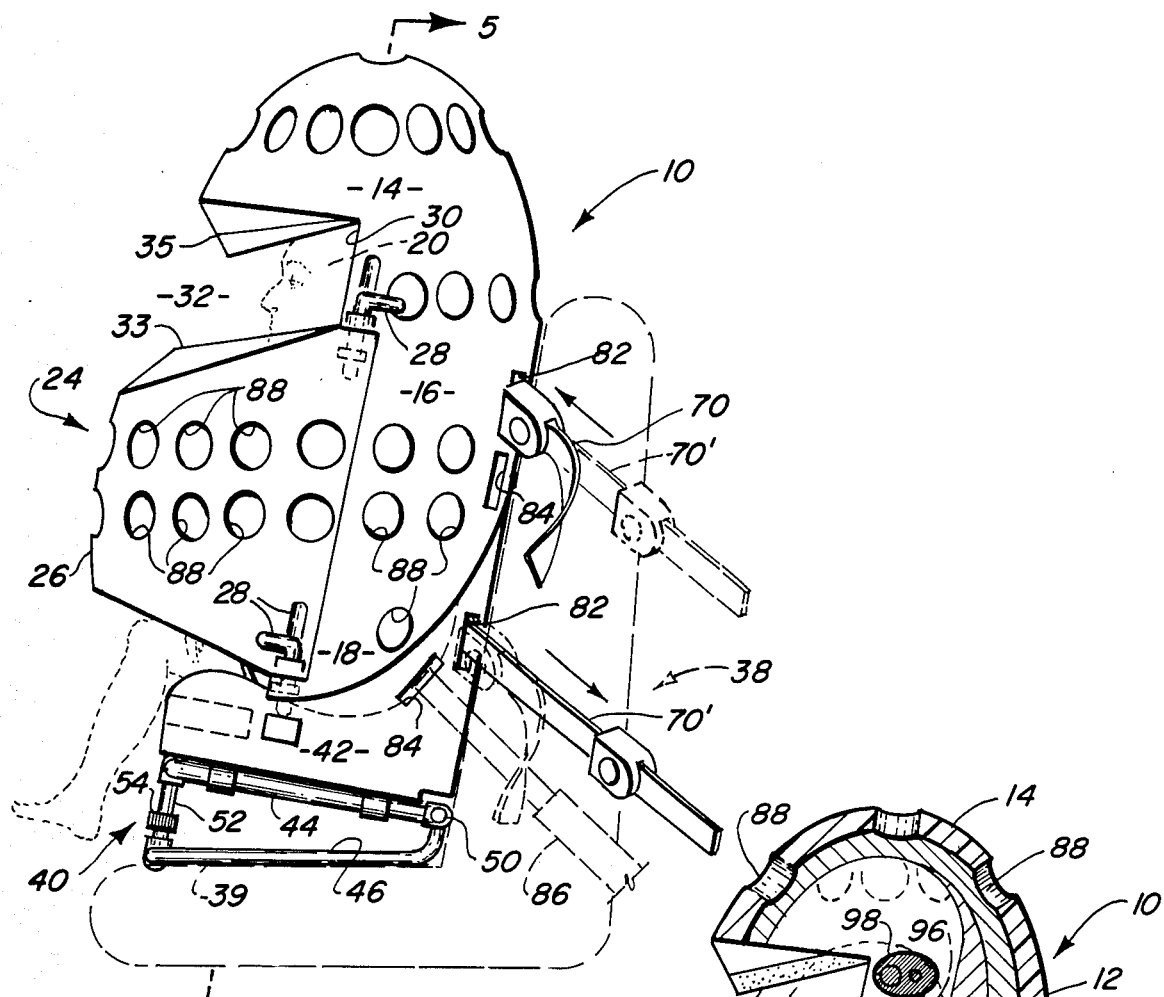
FIG. 3 is a side elevational view along line 3—3 of FIG. 1.
Figure 4:
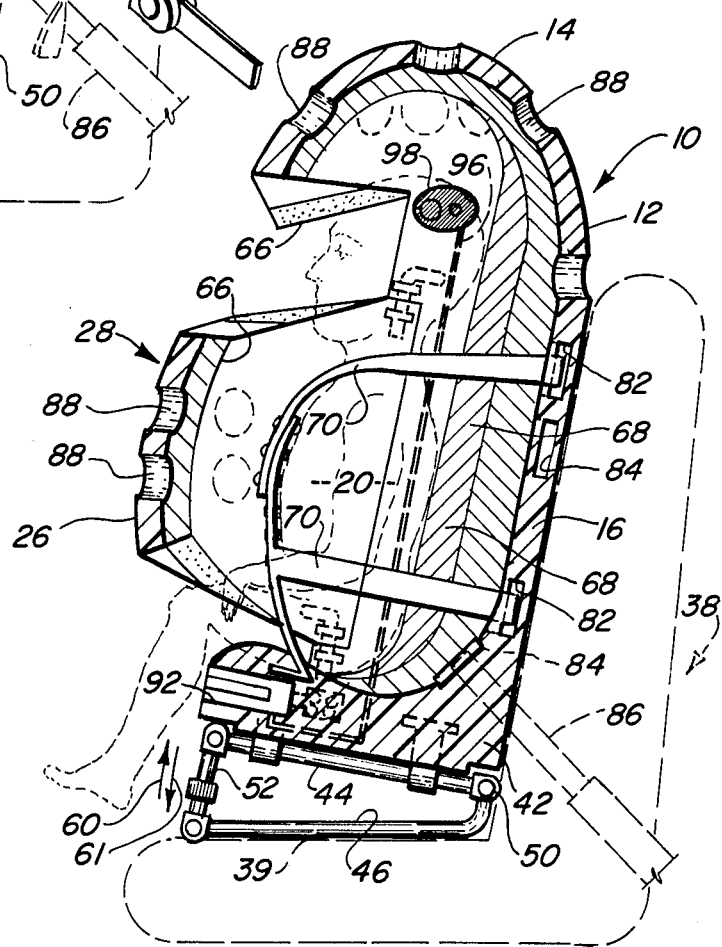
FIG. 4 is a longitudinal cross-sectional view along line 4—4 of FIG. 1.

The assembly 10 further includes a closure means generally indicated as 24 including a door structure 26 formed of the same lightweight, high strength, impact resistant material from which the remainder of the shell is formed. The door structure 26 is movably positioned and connected to the shell by hinge means 28 and 28', positioned and structured to interconnect opposite ends of the door to opposite sides of an access opening 30. As best shown in FIG. 2, the access opening 30 is formed at the front of the shell in contiguous relation to the top portion 14, mid portion 16 and bottom portion 18 of the shell. Again with reference to FIG. 2, the existence of the hinge means 28 and 28' on opposite sides of the door 26 allows for selective opening of the door from either end so that it will pivot outwardly from its closed position as shown in FIG. 1 to its open position as shown in FIG. 2. Such pivotal movement occurs from either end presenting an open position of the occurs from either end representing an open position of the door as at 26 being connected at one end and a secondary open position of the same door 26' when the hinge 28' pivots the door outwardly from the remainder of the shell. The access opening 30 is configured and dimensioned to allow easy positioning and removal of the occupant 20 from the hollow interior of the shell. With reference to FIGS. 1, 3 and 4, it should be noted that the door structure 26 has a generally lesser dimension than the access opening 30 allowing for the existence of a viewing space 32 which is generally aligned with the face or frontal portion of the head of the viewer 20 to allow him to view outwardly therefrom and enjoy the surrounding interior of the vehicle or the exterior sights when traveling. it should be readily apparent that the viewing space 32 is defined by the upper periphery as at 33 of the door 26 as well as the lower periphery 36 of the top portion 14. With reference to FIGS. 1, 2 and 3, it should be apparent that the outer surface configuration of the shell as well as the door 26 is such as to be cooperative with one another so as to collectively define a substantially ovoidal configuration adding both structural integrity and a pleasing aesthetic appearance to the shell when positioned on a supporting surface or vehicle seat generally indicated as 38.

The vehicle seat 38 may define a supporting surface 39 on which the assembly 10 is positioned. More specifically, a base generally indicated as 40 serves to be fixedly connected to and support the shell by a bracing structure including a receiving cradle or stand 42 as part of the housing being secured to a brace member 44 secured directly to the remainder of the base 40. A support platform 46 engages the supporting surface 39 and is pivotally connected as at 50 to the brace 44. The opposite end of the base 40 includes a linkage assembly 52 specifically structured to be longitudinally extendable and retractable by operation of an adjusting lock nut 54. It should be readily apparent therefore and with specific reference to FIGS. 3 and 4 that the longitudinal extension of the adjusting linkage 52 causes an increase in the space distance between the shell and the supporting surface 39 or seat 38 and also varies the inclination of the occupant 20 within the interior of the shell. Similarly, a retraction of the linkage 52 through manipulation of adjustment nut 54 serves to shorten the space between the shell and the supporting surface 39 of seat 38 thereby orienting the occupant 20 in a more upright sitting position. Directional arrows 60 and 61 are representative respectively of the aforementioned extended and retracted positions of the adjusting linkage 52.

By way of further protection to the occupant 20, the entire inner surface of the shell 12 and interior surface of the door 26 includes sufficient padding in the form of foam rubber or like adequate padding material 66 extending inwardly into the interior of the housing so as to prevent harmful engagement or impact of the occupant with the rigid material from which the shell and door are formed. (See FIG. 4). The interior of the housing 12 further includes an occupant supporting means in the form of a seat or bottom and back support 68 which maintains the occupant 20 in either a seated or somewhat inclined position depending upon the angular orientation or incline of the shell 12 relative to the supporting surface 39 and seat 38.

Figure 5:
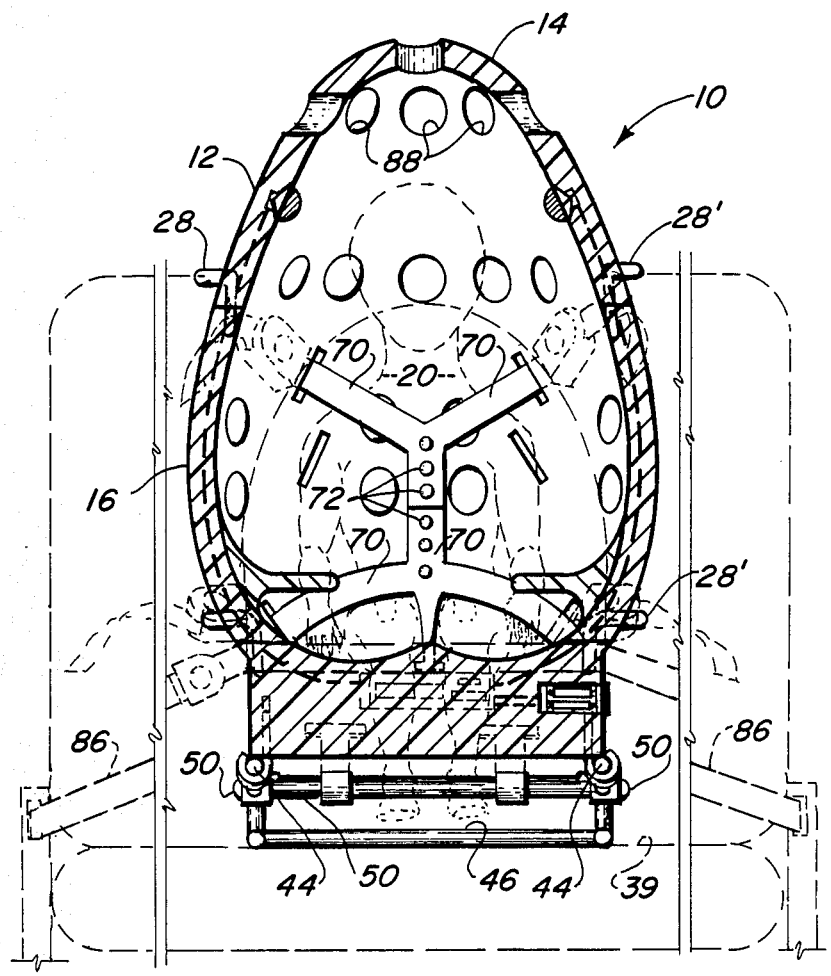
FIG. 5 is a sectional view along line 5—5 of FIG. 3.

Occupant containment means in the form of safety shoulder or bracing straps 70 may be provided and designed to overlap the shoulders, frontal portion and hip areas of the occupant 20 as clearly shown in FIGS. 1, 4 and 5. Adjustment or connecting attachments 72 may be provided to interconnect the straps 70 and size it to the occupant. Such anchoring or bracing straps 70 may be secured to the shell by means of a plurality of passages 82 (see FIGS. 3 and 4).

Additional connecting means in the form of integrally formed channels or passages 84 may also be formed in the rear portion of the shell 12 so as to engage safety harness 86 represented in phantom lines associated with or mounted on the vehicle. Such passages 84 may be varied in position and numbered so as to be readily adaptable to the design and placement of the safety harnesses 86 in a variety of different types of vehicles.

Finally, ventilation means are provided in the form of an apertured construction of the shell 12 which in turn may be defined by a plurality of apertures 88 varying in number and location. Each aperture extends through both the rigid material from which the shell and/or door 12 and 26 respectively are formed and also through the various padding 66 associated therewith. Accordingly, a plurality of individual air flow paths are defined by the plurality of apertures 88 allowing for passage of air into and out of the interior of the shell 12 to keep the occupant 20 at an appropriate temperature close to the interior of the vehicle in which the assembly 10 is mounted.

Yet another embodiment of the present invention includes a supplementary feature of an audio mechanism or assembly generally indicated as 90 and disposed within an appropriate compartment means 92 formed in an underportion of the assembly 10 adjacent or as part of the cradle 42 secured to the brace 44. This audio mechanism or assembly 90 could be considered a radio, cassette player, etc. and could be self-contained in terms of being connected to portable battery or electrically connected to the battery of the vehicle. The audio mechanism 90 is also electrically connected by conventional conductors or wiring 96 to a speaker assembly. The speaker assembly includes at least one but preferably two speaker elements 98 mounted on opposite sides of the head of the occupant and providing him with stereophonic sound received directly from the the audio mechanism 90. Such sound could picked up from a central broadcasting network or be fed individually and "privately" to the occupant 20 of the assembly 10 such as for educational and for entertainment purposes.

What is claimed is:

1. A protective support assembly for an occupant of a vehicle, said assembly comprising:
   a. a base positionable on a supporting surface within the vehicle and a housing mounted on said base and including a hollow interior portion dimensioned to contain an occupant therein,
   b. occupant support means contained within said housing for maintenance of the occupant in a supported position,
   c. containment means mounted within said hollow interior portion in adjacent relation to said occupant support means and structured for engagement with and containment of the occupant in said supported position,
   d. said housing comprising an outer shell formed of impact-resistant material and configured to define a substantially surrounding enclosure of the occupant,
   e. said shell comprising an integral one-piece construction including a bottom portion, mid portion, top portion and an access opening contiguous to said bottom, mid and top portions and communicating with said hollow interior portion,
   f. said top portion configured in a surrounding disposition relative to rear, top and frontal portions of the occupant's head; said mid portion configured in surrounding disposition relative to rear and opposite sides of the occupant's torso and said bottom portion configured in surrounding disposition to underportions of the occupant's body and being connected to said occupant support means,
   g. closure means comprising a door movably secured to said shell for at least partial closure of said access opening and selective positioning between an open and a closed position relative to said access opening and said hollow interior portion, said closed position defined by substantially covering, protective disposition of the frontal portion of the occupant by said door structure,
   h. said closure means having a lesser dimension than said access opening and configured to define a viewing space through said access opening when said door is in said closed position, said viewing space disposed between and defined by an upper periphery of said door structure and a lower periphery of said top portion of said shell,
   i. connecting means formed on said shell and disposed and configured for connection with an interior of the vehicle, whereby said shell is maintained on the supporting surface of the vehicle, and
   j. padding structure secured to and extending outwardly from an interior surface of said shell and said door in surrounding and at least partially enclosing relation to the occupant within said hollow interior portion.

2. An assembly as in claim 1 wherein said shell and said door each comprise a curvilinearly configured outer surface configuration cooperatively disposed and dimensioned to collectively define a substantially ovoidal configuration wherein said door is in said closed position.

3. An assembly as in claim 1 further comprising ventilation means for the cooling and passage of air into said hollow interior portion and defined by said shell having an apertured construction through said material from which said shell is formed.

4. An assembly as in claim 3 wherein said apertured construction comprises a plurality of apertures integrally formed in said shell and passing therethrough to define a plurality of paths of air flow into and out of said hollow interior portion.

5. An assembly as in claim 1 further comprising said connecting means including at least one passage structure integrally formed in said shell and having an elongated configuration of sufficient transverse dimension to receive and allow passage therethrough of a restraining strap mounted in the vehicle.

6. An assembly as in claim 1 wherein said containment means comprises a bracing strap assembly achored at opposite ends thereof and extending over shoulder and frontal portions of the occupant and further structured to contain the occupant within said occupant support means.

7. An assembly as in claim 1 further comprising compartment means secured on said housing for the enclosure of an audio equipment assembly, a speaker assembly mounted at least partially within said hollow interior portion and electrically connected to said audio equipment assembly, said speaker assembly disposed to direct sound to the occupant within said hollow interior portion.

8. An assembly as in claim 7 wherein said speaker assembly comprises two speaker structures each electrically connected to said audio equipment assembly and being mounted in said top portion of said shell on opposite sides of said head of the occupant.

9. An assembly as in claim 1 wherein said base comprises an adjustment means for regulating inclination and spacing of said shell relative to said supporting surface.

10. An assembly as in claim 9 wherein said base comprises a support platform engaging the supporting surface within the vehicle, a bracing structure movably connected to said support platform and supportingly engaging said shell and said adjustment means disposed in adjustable interconnection between said support platform and said bracing structure.

11. An assembly as in claim 10 wherein said adjustment means comprises a linkage assembly longitudinally extendable and retractable and defining a spaced distance between said support platform and said brace structure.

12. An assembly as in claim 11 wherein said support platform is pivotally connected at one end to said brace structure, said linkage assembly positionable between opposite ends thereof, whereby variance in longitudinal dimension of said linkage assembly varies the space and inclination between said shell and said support surface of the vehicle

* * * * *